United States Patent
Azumi et al.

(10) Patent No.: US 9,720,536 B2
(45) Date of Patent: Aug. 1, 2017

(54) SENSOR-EQUIPPED DISPLAY DEVICE AND METHOD OF CONTROLLING THE SAME

(71) Applicant: Japan Display Inc., Minato-ku (JP)

(72) Inventors: Kohei Azumi, Tokyo (JP); Hiroshi Mizuhashi, Tokyo (JP); Hayato Kurasawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 73 days.

(21) Appl. No.: 14/852,748

(22) Filed: Sep. 14, 2015

(65) Prior Publication Data

US 2016/0092020 A1     Mar. 31, 2016

(30) Foreign Application Priority Data

Sep. 26, 2014  (JP) ................................ 2014-196696

(51) Int. Cl.
G06F 3/0488  (2013.01)
G06F 3/041  (2006.01)
G06F 3/044  (2006.01)

(52) U.S. Cl.
CPC ............ G06F 3/0412 (2013.01); G06F 3/044 (2013.01)

(58) Field of Classification Search
CPC ..... G06F 3/0488; G06F 3/04883; G06F 3/044
See application file for complete search history.

(56) References Cited

U.S. PATENT DOCUMENTS

| 2010/0182273 A1 | 7/2010 | Noguchi et al. |
| 2011/0187677 A1* | 8/2011 | Hotelling .............. G06F 3/0412 345/174 |
| 2014/0292686 A1 | 10/2014 | Yamamoto et al. |

FOREIGN PATENT DOCUMENTS

JP     2009-244958     10/2009

* cited by examiner

*Primary Examiner* — Carolyn R Edwards
*Assistant Examiner* — Mansour M Said
(74) *Attorney, Agent, or Firm* — Oblon, McClelland, Maier & Neustadt, L.L.P.

(57) ABSTRACT

According to one embodiment, a first substrate includes a gate line extending in a first direction, a source line extending in a second direction intersecting the first direction, a switching element SW which is connected to the gate line and the source line, and a pixel electrode which is connected to the switching element SW. The first substrate includes a common electrode which is opposed to the pixel electrode, and a detection electrode element Tx necessary for sensing a state of closeness of a conductor brought externally, that extends parallel to the common electrode and is formed of a metallic material. By this structure, power consumption of a drive electrode of an input sensor can be reduced, and improvement of a drive frequency can be obtained.

9 Claims, 15 Drawing Sheets

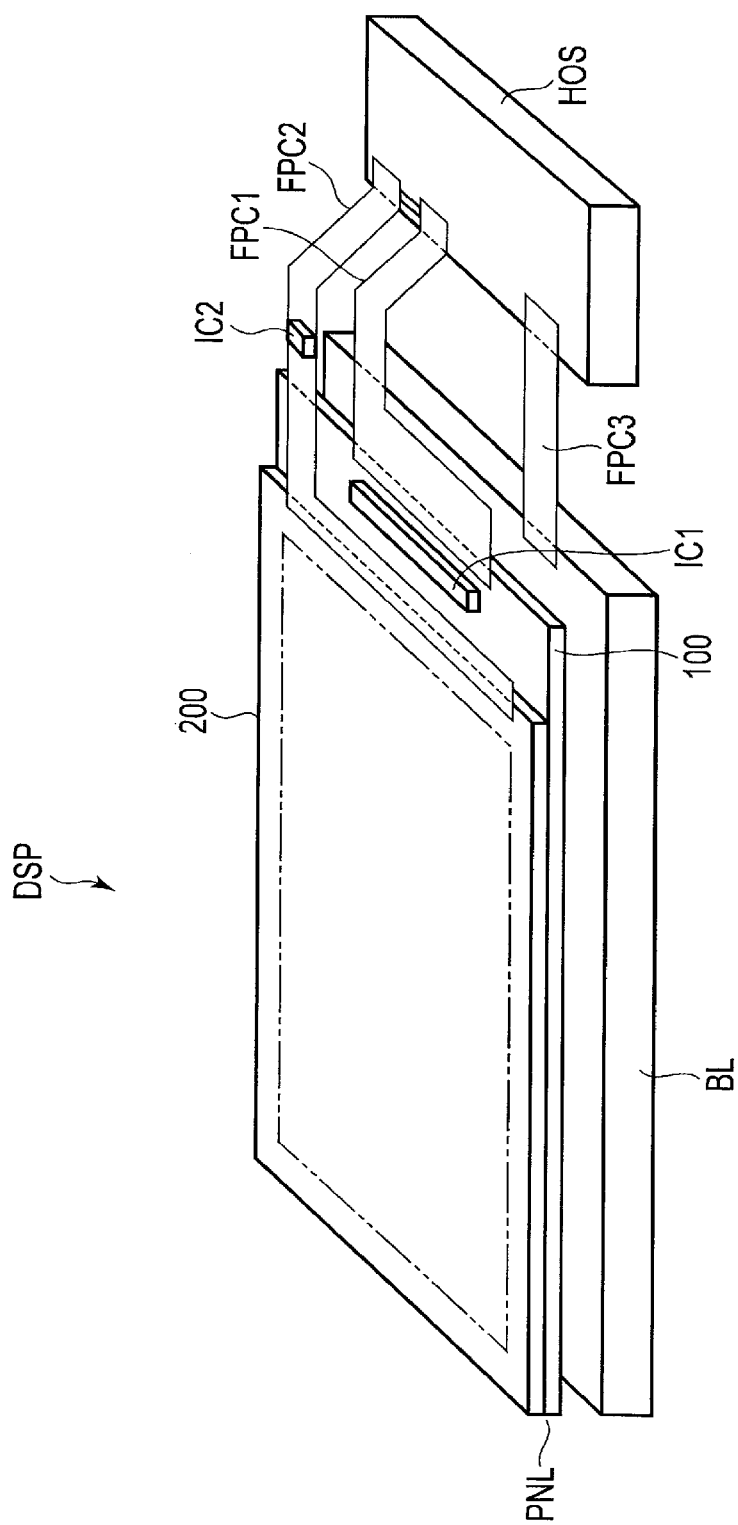
F I G. 1

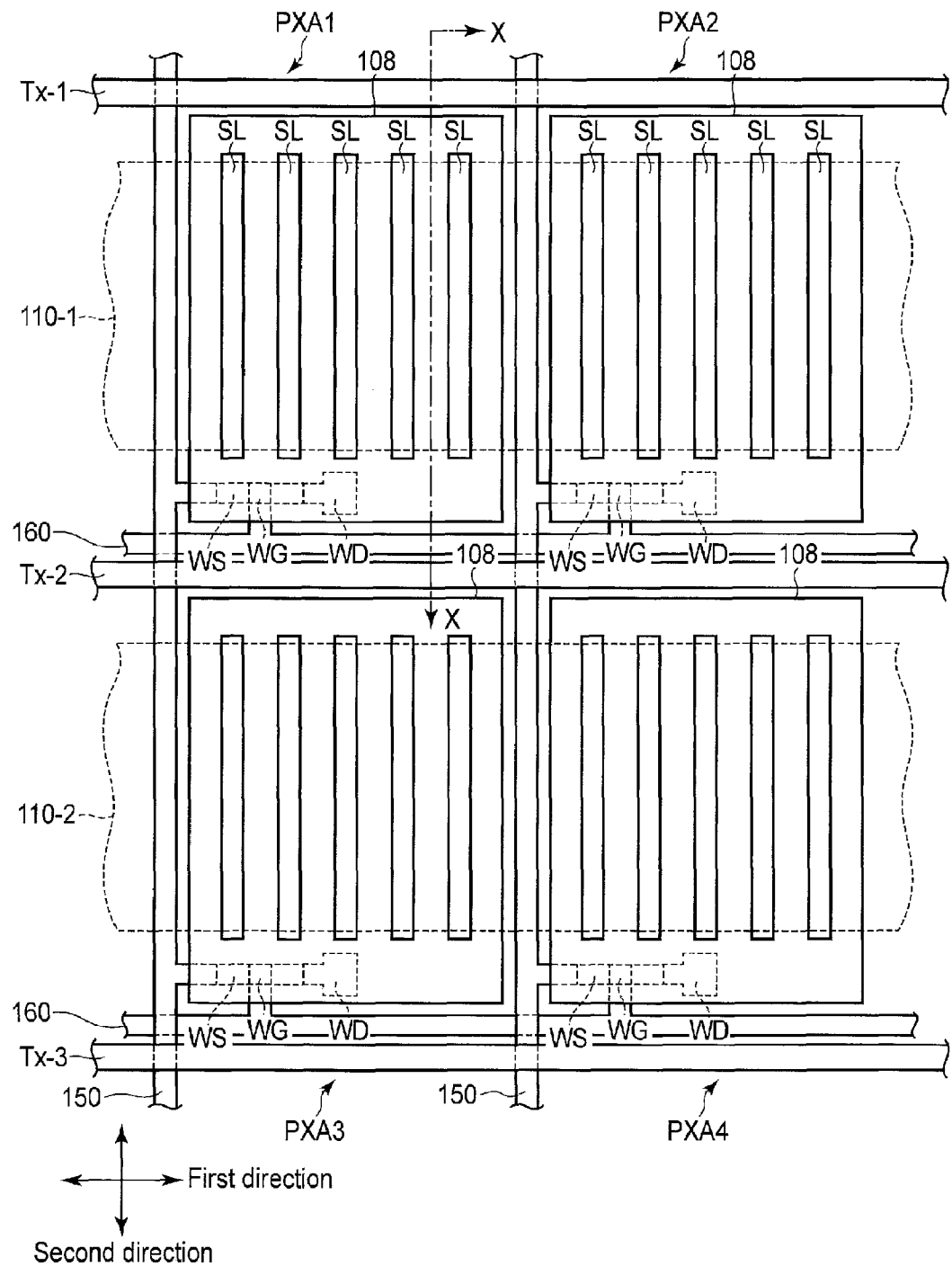
F I G. 8

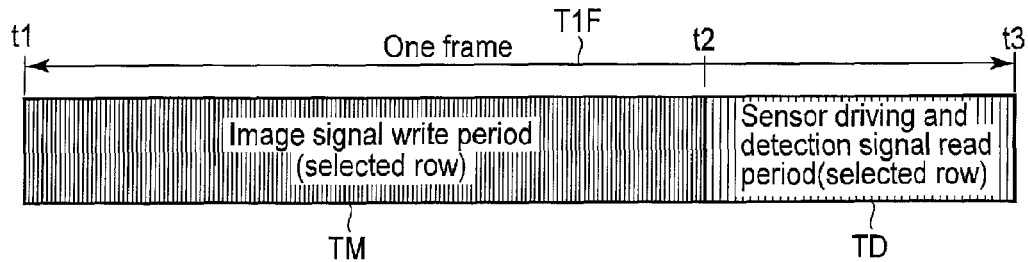
F I G. 9A
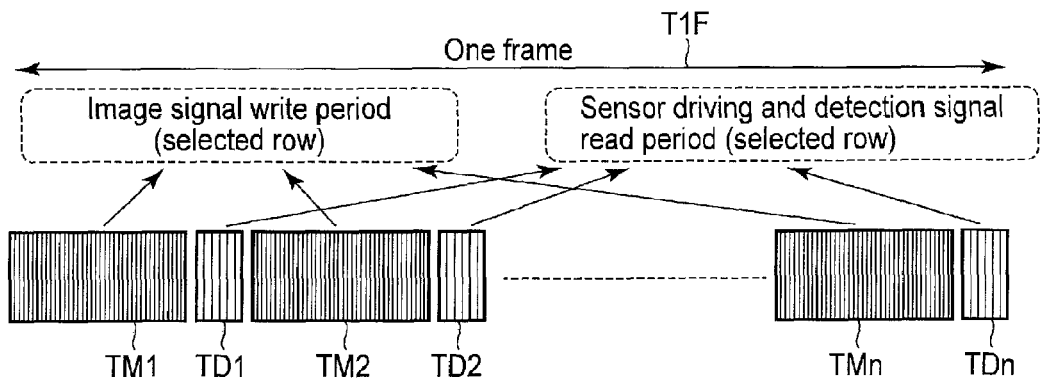
F I G. 9B
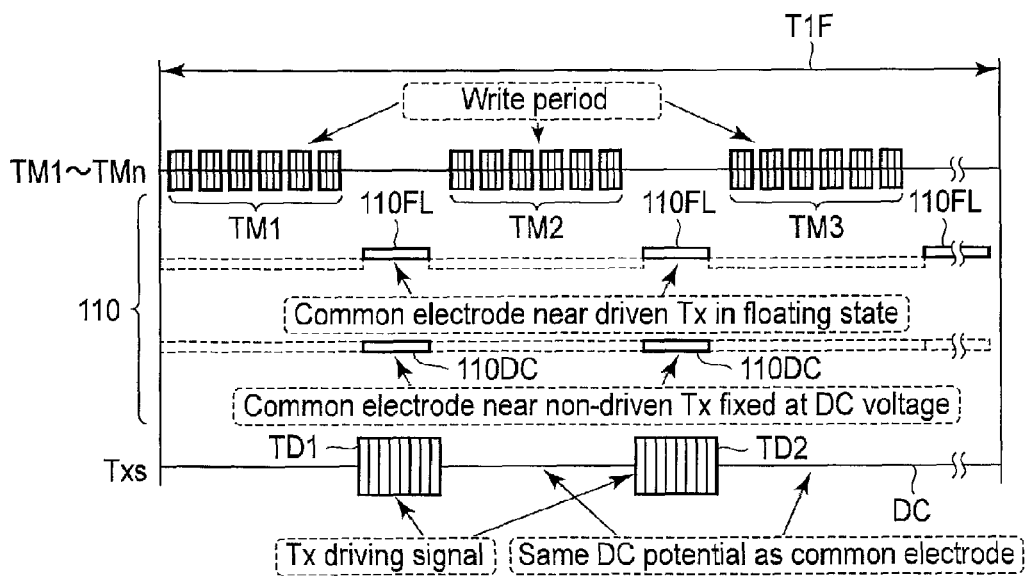
F I G. 10

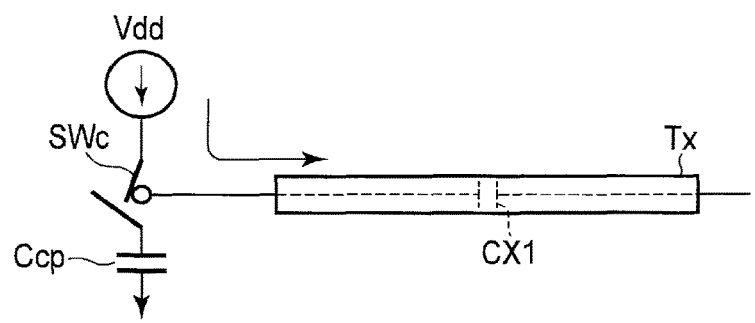
F I G. 12A
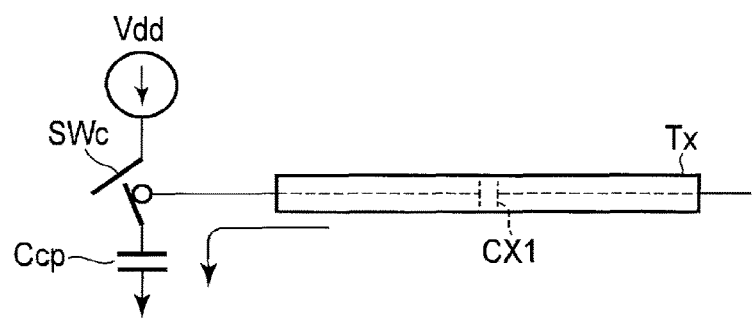
F I G. 12B
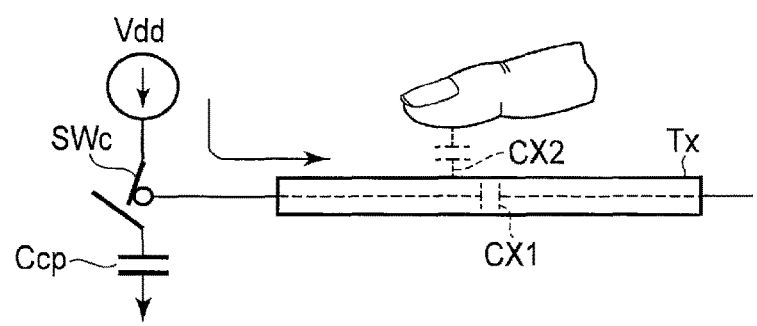
F I G. 12C

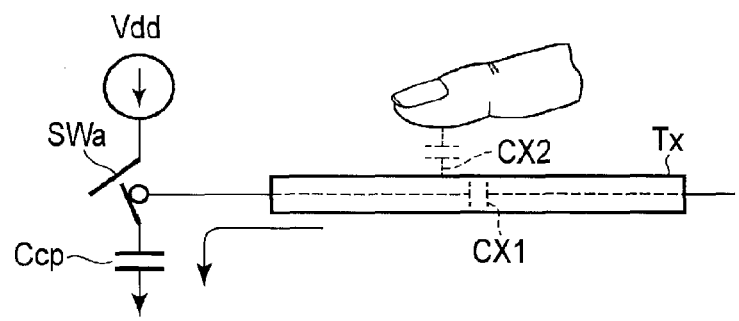
F I G. 12D
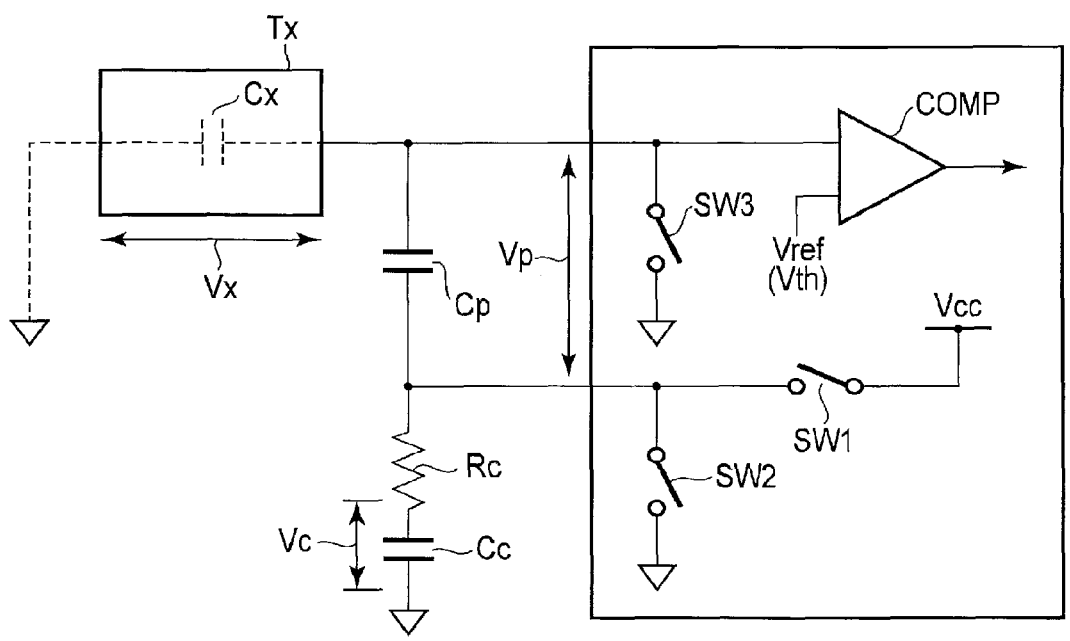
F I G. 13A

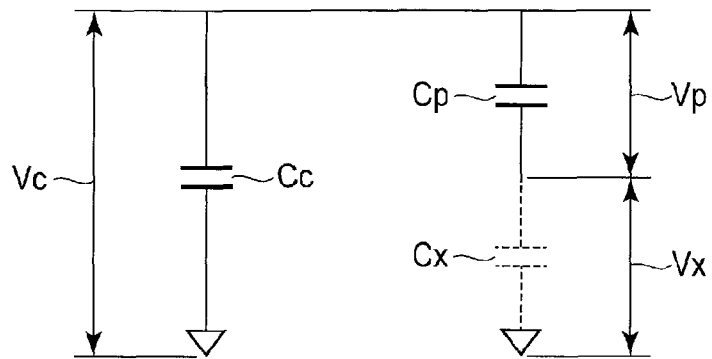
F I G. 13B
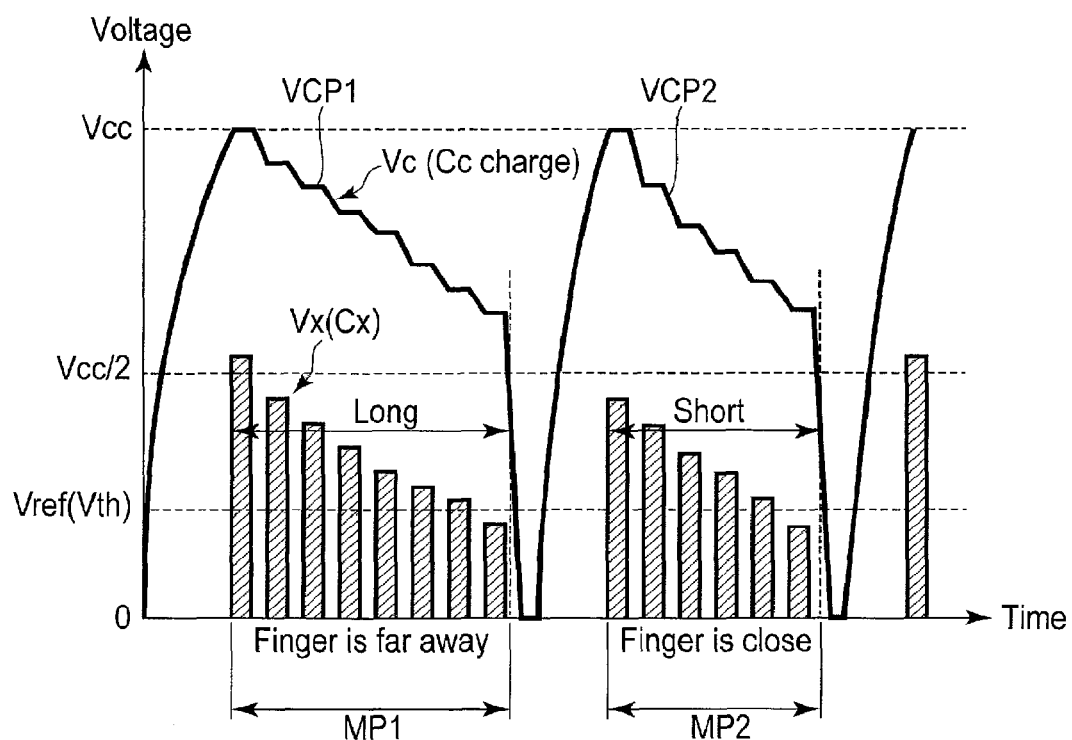
F I G. 14

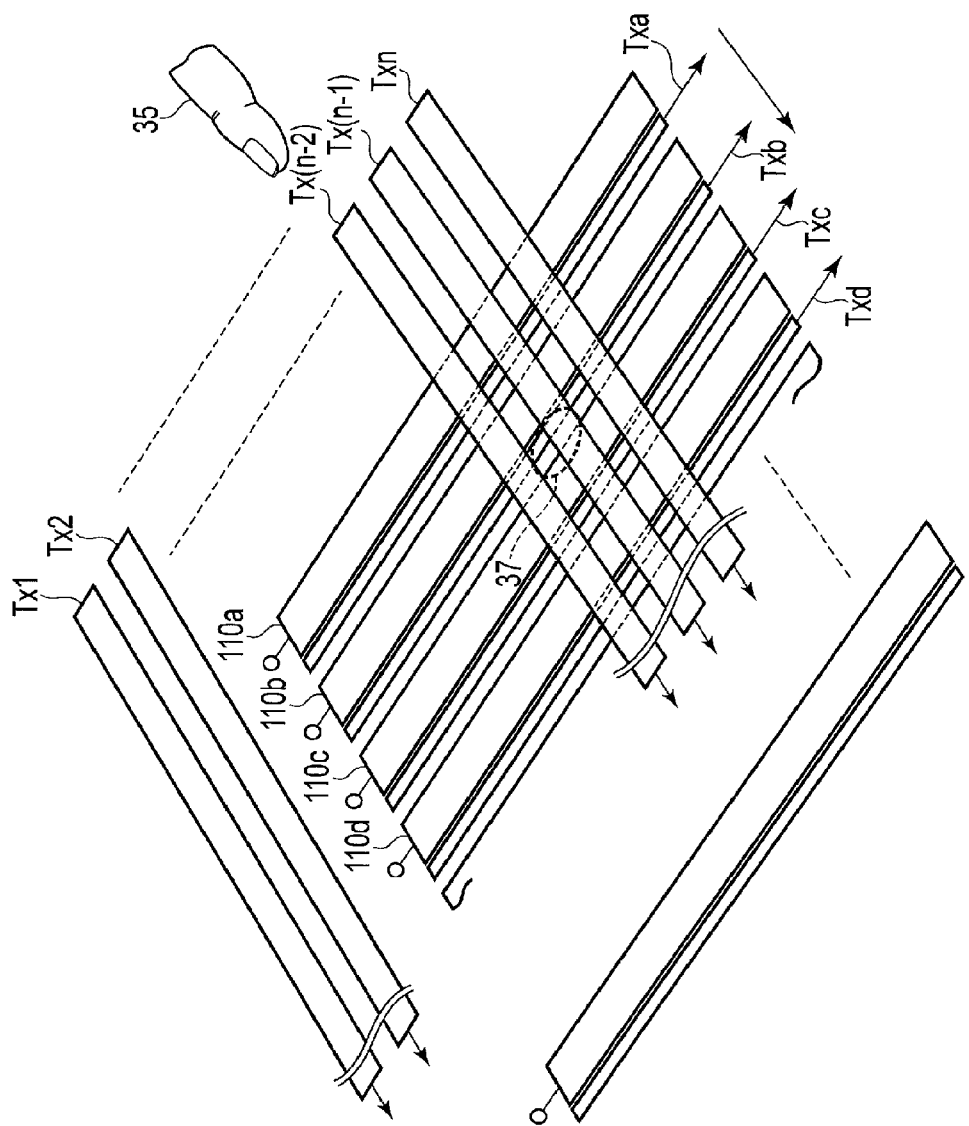
F I G. 15

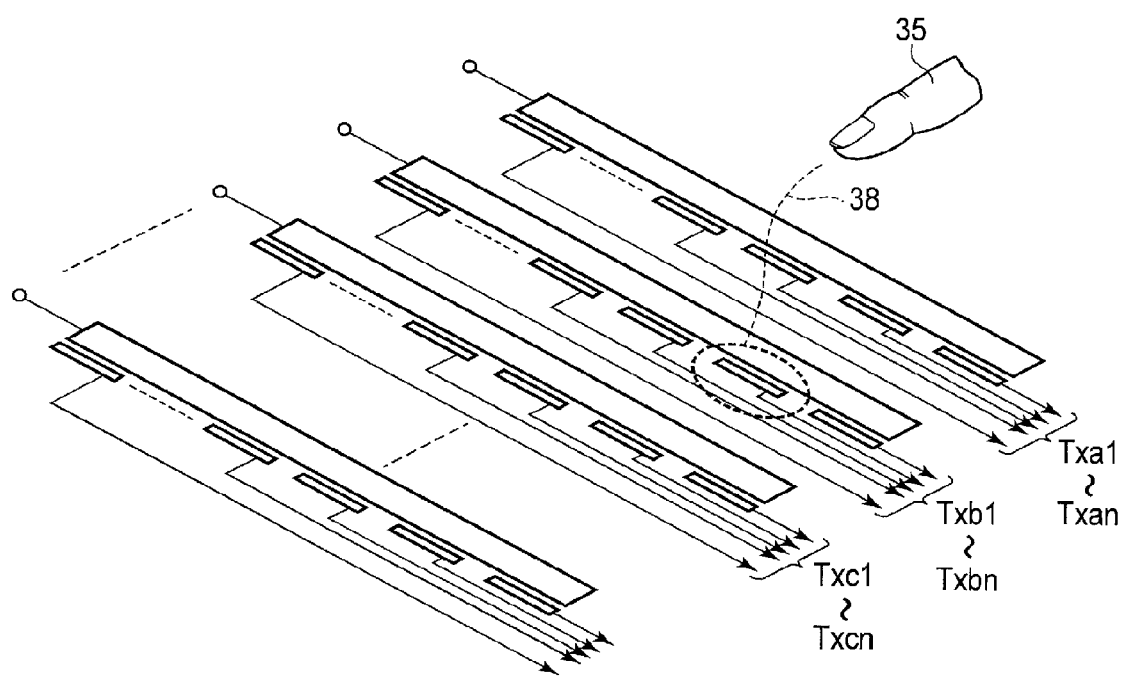
F I G. 16

SENSOR-EQUIPPED DISPLAY DEVICE AND METHOD OF CONTROLLING THE SAME

CROSS-REFERENCE TO RELATED APPLICATIONS

This application is based upon and claims the benefit of priority from Japanese Patent Application No. 2014-196696, filed Sep. 26, 2014, the entire contents of which are incorporated herein by reference.

FIELD

Embodiments described herein relate generally to a sensor-equipped display device and a method of controlling the display device.

BACKGROUND

Recently, portable devices (smartphones, tablet personal computers, personal digital assistants, etc.) have become widespread. Further, the portable device comprises an input sensor which detects a change in the capacitance. When a user's finger, for example, is brought close to a surface of a liquid crystal display panel of the portable device, the input sensor can detect position information of the user's finger as an operation input.

As the input sensor, an in-cell-type sensor which is incorporated into the interior of a liquid crystal display panel and an on-cell-type sensor which is disposed on the surface of a liquid crystal display panel are available.

In the in-cell-type sensor, a common electrode for liquid crystal driving (which is formed by indium-tin-oxide (ITO) having transparency) is used as a detection electrode element which constitutes the input sensor. Since the common electrode for liquid crystal driving is used as the detection electrode element of the input sensor, it is possible to prevent the thickness of the liquid crystal display panel from being increased and also to reduce the manufacturing steps for structuring the input sensor.

BRIEF DESCRIPTION OF THE DRAWINGS

FIG. 1 is a perspective view which schematically shows the structure of a display device according to one embodiment.

FIG. 8 shows a part of a pixel region as shown in FIG. 2 according to yet another embodiment.

FIG. 9A is an illustration for describing an example of a period in which the first detection electrode element is driven in the above-mentioned embodiment.

FIG. 9B is an illustration for describing another example of a period in which the first detection electrode element is driven in the above-mentioned embodiment.

FIG. 10 is an illustration for describing the operating state of the first detection electrode element and the common electrode in the above-mentioned embodiment.

FIG. 12A is an illustration for describing a self-detection method which can be applied to the display device, and shows the state in which a detection electrode is charged in the case where capacitance coupling is not formed between a detection electrode and a finger.

FIG. 12B is an illustration for describing the self-detection method following FIG. 12A, and shows the state of discharge from the detection electrode.

FIG. 12C is an illustration for describing the self-detection method which can be applied to the display device, and shows the state in which the detection electrode is charged in the case where capacitance coupling is formed between the detection electrode and a finger.

FIG. 12D is an illustration for describing the self-detection method following FIG. 12C, and shows the state of discharge from the detection electrode.

FIG. 13A is a circuit diagram showing an example of a basic structure which realizes the self-detection method.

FIG. 13B is an equivalent circuit schematic showing capacitances shown in FIG. 13A, and shows the state in which a charge of capacitor Cc is moved to capacitor Cp and capacitance Cx.

FIG. 14 is an illustration showing changes in values of voltage Vx with respect to capacitance Cx shown in FIGS. 13A and 13B by a bar graph, and changes in values of voltage Vc of capacitor Cc by a line graph.

FIG. 15 is an example showing the structure of detection electrode element Tx of the self-detection method.

FIG. 16 is another example showing the structure of detection electrode element Tx of the self-detection method.

DETAILED DESCRIPTION

Figure 2:
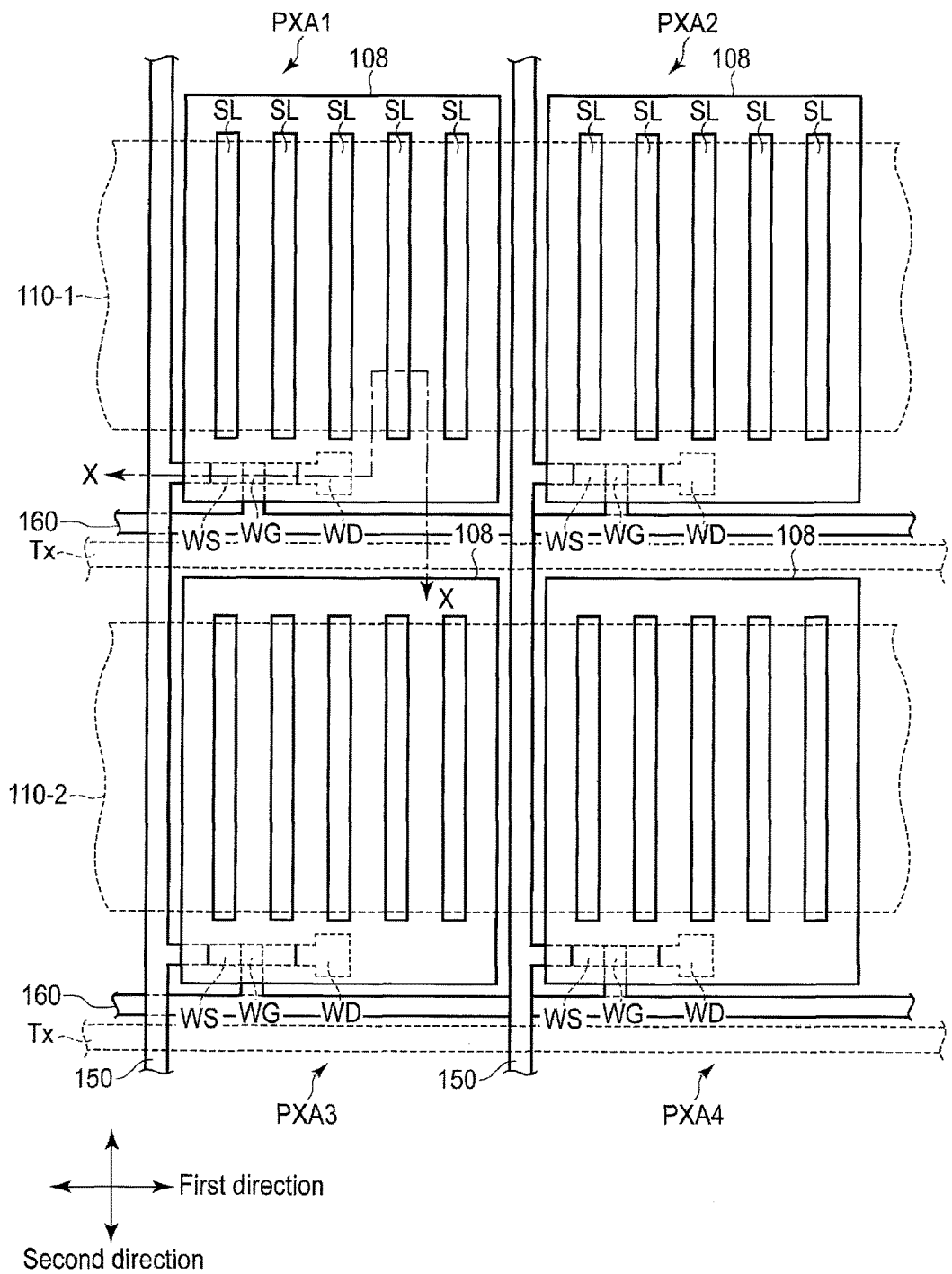
FIG. 2 is a plan view showing the positional relationship among a pixel electrode, a common electrode, and a first detection electrode element Tx of an input sensor of a display device according to one embodiment.

Various embodiments will be described hereinafter with reference to the accompany drawings.

Recently, the size of tablet personal computers, etc., as a mobile device has been increased, and display elements have been improved to achieve higher-resolution.

When the size of the device is increased, the length of a common electrode is increased, and so is its width as compared to conventional devices. Accordingly, a parasitic capacitance between, for example, the common electrode and a signal line is increased. A resistance of the common electrode is increased, and a resistance of a metallic interconnect disposed at a frame around a display area is also increased.

As a result, a drive frequency of an input sensor may be lowered. Also, power consumption of the device is increased because of the increase in the resistance of the interconnection.

Hence, embodiments described herein aim to provide a sensor-equipped display device and a method of controlling the display device, whereby an increase in the parasitic capacitance and an increase in the interconnect resistance can be reduced, and as a consequence, power consumption of a drive electrode of the input sensor and improvement of the drive frequency can be obtained.

The input-sensor-equipped display device according to one embodiment comprises:

(1) a first substrate comprising a gate line extending in a first direction, a source line extending in a second direction intersecting the first direction, a switching element which is electrically connected to the gate line and the source line, and a pixel electrode which is electrically connected to the switching element; a common electrode which is opposed to the pixel electrode and extending in the first direction; and a detection electrode element necessary for sensing the state of closeness of a conductor brought externally (or an operation input), which extends parallel to the common electrode and is formed of a metallic material; and (2) a second substrate which is opposed to the first substrate, and the second substrate comprises a light-shielding layer (which may also be referred to as a light-shielding film) which is opposed to the gate line and the detection electrode element, and extends in the first direction.

In the following, referring to the accompanying drawings, the sensor-equipped display device and a method of driving the same according to one embodiment will be described in detail specifically. In the present embodiment, the display device is a liquid crystal display device.

FIG. 1 is a perspective view showing a schematic structure of a sensor-equipped display device according to one embodiment. In FIG. 1, a liquid crystal display device DSP comprises, for example, an active-matrix-type display panel PNL, a drive IC chip IC1 which drives the display panel PNL (which may also be referred to as a first IC chip or a drive circuit), a capacitance-change-sensing-type input sensor (which will be described later), a touch IC chip IC2 which drives the input sensor (which may also be referred to as a second IC chip or a sensor circuit), a backlight unit BL which illuminates the display panel PNL, a host device (which may also be referred to as a system control block) HOS, and flexible interconnect substrates FPC1, FPC2, and FPC3. As described later, the display panel PNL comprises a first substrate 100 and a second substrate 200, and includes a liquid crystal layer 300 between the two substrates.

Figure 3:
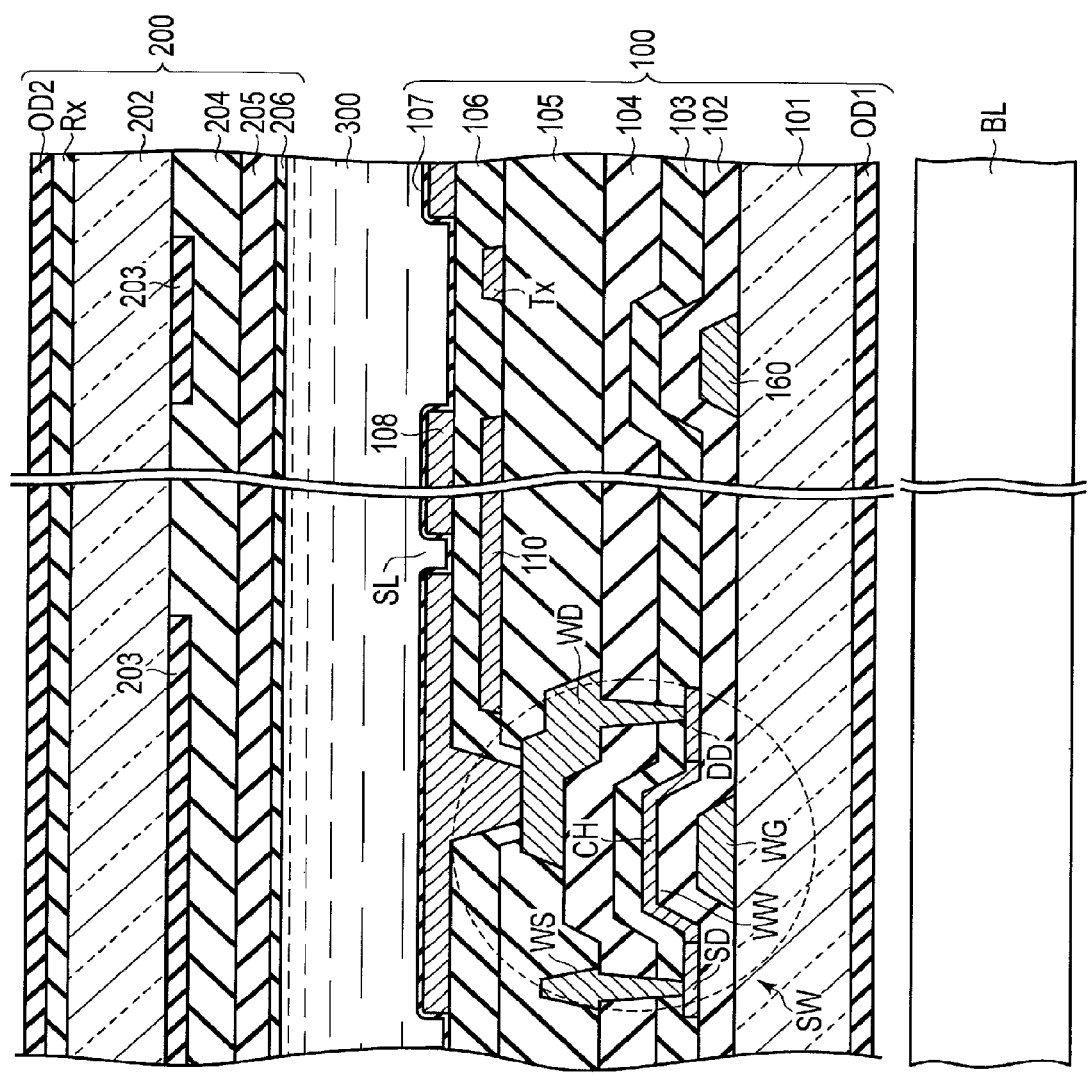
FIG. 3 is a cross-sectional view of a part of a pixel region shown in FIG. 2, that is, a cross-sectional view taken along line X-X of FIG. 2.

FIGS. 2 and 3 illustrate examples of a partial plan view and a partial cross-sectional view of the display panel PNL of the sensor-equipped display device according to one embodiment.

FIG. 2 representatively shows four pixel regions PXA1, PXA2, PXA3, and PXA4 which are arranged two-dimensionally.

FIG. 2 shows the positional relationship among pixel electrodes 108, common electrodes 110 (110-1, 110-2, . . . ), and first detection electrode elements Tx which form the input sensor to be described later. The first detection electrode element Tx is an electrode which is necessary for sensing (detecting) the so-called touch input (the state of closeness of a conductor brought externally or an operation input).

The pixel electrodes 108 are disposed two-dimensionally. Also, in each of the pixel electrodes 108, a plurality of slits SL are formed so that an electric field for driving liquid crystal molecules of the liquid crystal layer 300 (FIG. 3) can be formed. In the display device, as a method for driving the liquid crystal molecules between the pixel electrode 108 and the common electrode 110, fringe field switching (FFS) or in-plane switching (IPS), etc., may be adopted.

Further, FIG. 2 shows a plurality of gate lines 160 (which may also be referred to as scanning lines) disposed parallel to each other in a first direction, and a plurality of source lines 150 (which may also be referred to as signal lines) disposed parallel to each other in a second direction intersecting the first direction. A set of the pixel electrode 108 and a switching element (which will be described later) is arranged near an intersection of the gate line 160 and the source line 150. The switching element is constituted by, for example a thin-film transistor (TFT).

Also, the first detection electrode elements Tx which will be described later are disposed parallel to the common electrodes 110. The first detection electrode elements Tx constitute an element of the sensor for detecting the so-called touch input. Preferably, the first detection electrode elements Tx should not be overlapped with the pixel electrodes in a top view.

FIG. 3 shows a cross-section of a part of a pixel region, in particular. FIG. 3 is a cross-sectional view of a liquid crystal display device including the first substrate 100, the second substrate 200, the liquid crystal layer 300, and the backlight unit BL taken along line X-X (FIG. 2). In FIG. 3, 100 represents the first substrate (which may also be referred to as an array substrate), and 200 represents the second substrate (which may also be referred to as a counter-substrate). The first substrate 100 and the second substrate 200 are opposed to each other with the liquid crystal layer 300 interposed therebetween.

In the display panel PNL, the liquid crystal molecules are subjected to alignment control in accordance with the state of an electric field, and the light which passes can be modulated. For an alignment control mode of the liquid crystal molecules, a lateral electric field mode such as the aforementioned fringe field switching (FFS) or in-plane switching (IPS) is adopted.

The second substrate 200 comprises, in the order of constituent elements from the outer side to the inner side (the side of the liquid crystal layer 300), a polarization film OD2, a second detection electrode element Rx for forming the input sensor, a glass substrate 202, a light-shielding layer 203, a color filter 204, an overcoat layer 205, and an alignment film 206.

The color filter 204 changes the light which has passed through the liquid crystal layer 300 into colored light. The light-shielding layer 203 prevents unnecessary reflected light from being emitted from a metallic electrode of the switching element or a metallic interconnect which is disposed in a non-display area to be described later. The overcoat layer 205 is provided on the inner side (i.e., the side of the liquid crystal layer) of the color filter 204, and is intended to modulate the unevenness of the color filter 204.

The function and the operation of the second detection electrode element Rx will be described in detail later together with the first detection electrode elements provided on the side of the first substrate 100.

On the outer side of the first substrate 100 (the lower side in the drawing), the backlight unit BL is disposed. In the first substrate 100, in the order of constituent elements from the outer side to the side of the liquid crystal layer 300, a polarization film OD1, a glass substrate 101, a first insulating layer 102, a second insulating layer 103, a third insulating layer 104, a fourth insulating layer 105, a fifth insulating layer 106, and an alignment film 107 are disposed.

The polarization film OD1 of the first substrate 100 and the polarization film OD2 of the second substrate 200 have the relationship that the directions of polarization of these polarization films are orthogonal to each other, for example.

The first substrate 100 comprises a switching element SW which employs a semiconductor. Although one switching element SW is shown as a typical example of the switching elements in the drawing, a plurality of switching elements are arranged within the first substrate 100 two dimensionally (i.e., in the first direction and the second direction which intersects the first direction).

Each of the switching elements SW comprises a gate electrode WG, a semiconductor layer WW, a source electrode WS, and a drain electrode WD. The semiconductor layer WW comprises a channel region CH at a central position which is opposed to the gate electrode WG, and a source region SD and a drain region DD on both sides of the channel region CH. The source region SD is connected to the source electrode WS, and the drain region DD is connected to the drain electrode WD.

The gate electrode WG, the source electrode WS, and the drain electrode WD are made of metal such as aluminum. The gate electrode WG is connected to the gate line 160 (FIG. 2) formed on the glass substrate 101. The insulating layer 102 is provided between the gate electrode WG and the semiconductor layer WW. Further, the semiconductor layer WW is disposed between the insulating layers 102 and 103.

The source electrode WS is connected to the source region SD via contact holes of the insulating layers 103 and 104, and the drain electrode WD is also connected to the drain region DD via contact holes of the insulating layers 103 and 104.

The source electrode WS is connected to the source line 150 (FIG. 2), and a write signal (which may also be referred to as a pixel signal) is supplied from the source line 150. The drain electrode WD is connected to the pixel electrode 108 via the insulating layers 105 and 106. The pixel electrode 108 comprises the slits SL as shown in FIG. 2. The pixel electrode 108 is an electrode corresponding to the switching element SW.

In the first substrate 100, a plurality of pixel electrodes are arranged two-dimensionally such that they correspond to a plurality of switching elements SW.

The common electrode 110 is provided on the insulating layer 105, that is, between the insulating layers 105 and 106, and along one of the arrangement directions of the pixel electrodes. Although FIG. 3 shows the common electrode 110 corresponding to one of the pixel electrodes 108, this common electrode also corresponds to the other adjacent pixel electrode (as shown in FIG. 2). For example, as shown in FIG. 2, with respect to the pixel electrodes 108, 108, . . . which are arranged in the first direction, a single common electrode, i.e., the common electrode 110-1 or 110-2, is disposed. Accordingly, a plurality of common electrodes, i.e., the common electrodes 110-1 and 110-2, are arranged in the second direction intersecting the first direction. The number of common electrodes 110 which are arranged in the second direction intersecting the first direction is set as appropriate according to the specification of the display device.

Further, in the same layer as the layer where the common electrode 110 is disposed, the first detection electrode element Tx which constitutes the input sensor to be described layer is formed. The first detection electrode element Tx is separated from the common electrode 110, and is disposed along the common electrode 110. The pixel electrode 108 and the common electrode 110 are transparent electrodes made of ITO, for example.

In the display panel PNL described above, the gate line 160 is selectively driven by a gate drive circuit not shown. When a drive voltage is supplied to a predetermined gate line 160, the switching element SW which is connected to this gate line 160 is in an on-state. Here, when a write signal is provided to the source line 150 from a source drive circuit, the signal is written in a corresponding pixel circuit via the switching element SW which is in the on-state. The matter that a signal is written means that a voltage according to a write signal (a pixel signal) is charged and held between the pixel electrode and the common electrode which form one pair. As a result, in accordance with the charged voltage, an electric field that passes through the slits SL of the pixel electrode is produced between, for example, the pixel electrode 108 and the common electrode 110. By this electric field, liquid crystal molecules of the liquid crystal layer 300 are driven, and by this phenomenon, the amount of light that passes through the liquid crystal layer 300 is controlled.

Figure 4:
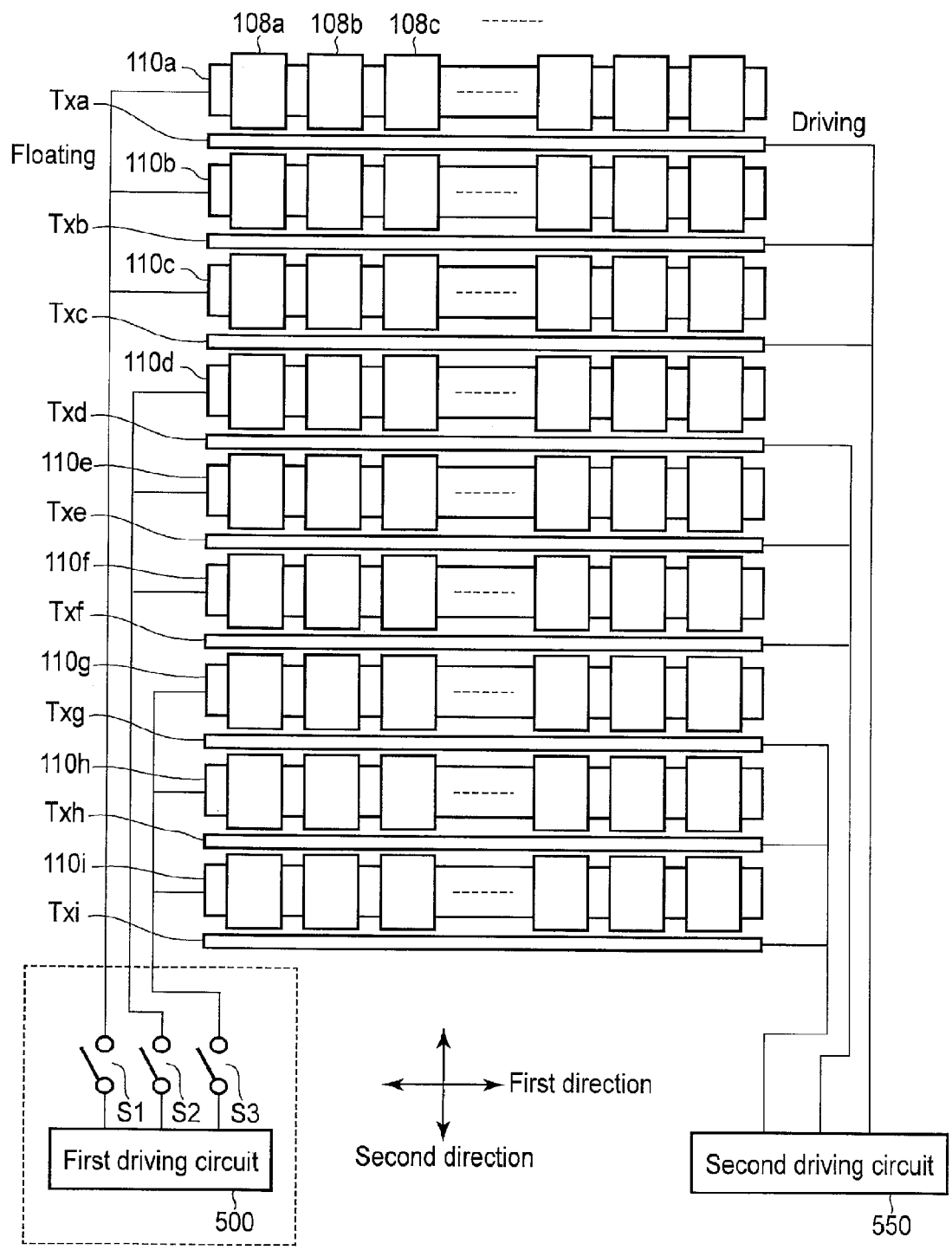
FIG. 4 is an illustration for describing the positional relationship among a common electrode, a first detection electrode element, and a pixel electrode.

FIG. 4 is an illustration for describing the positional relationship between the common electrode 110 and the first detection electrode element Tx, and an example of driving these electrode and element. The example of driving is an example for driving the common electrode 110 and the first detection electrode element Tx to be operated as the input sensor. Since FIG. 4 illustrates a plurality of common electrodes and a plurality of first detection electrode elements, suffixes a, b, c, . . . are added to the reference numbers.

The common electrodes 110a, 110b, 110c, . . . can be controlled per several rows by a first driving circuit (which may also be referred to as a common electrode control circuit) 500. FIG. 4 shows a configuration example in which the common electrodes can be controlled per three rows. For example, by closing switch S1 (to establish an on state) and opening switches S2 and S3 (to establish an an off state), the first driving circuit 500 can make the common electrodes 110a to 110c, which are the three electrodes in the upper part of the drawing, fixed at a constant direct current (DC) voltage, and allow the remaining common electrodes 110d to 110i to be in a floating state.

Similarly, the first detection electrode elements Txa to Txi can also be driven per three rows in synchronization with the driving of the common electrodes by a second driving circuit (which may also be referred to as a detection electrode control circuit) 550.

In the above-described embodiment, a plurality of pixel electrodes are arranged over each row of a set of the common electrode and first the detection electrode element in the first direction. In FIG. 4, reference numbers 108a, 108b, 108c, . . . are representatively added to the plurality of pixel electrodes in a row. Pixel electrodes are arranged in the other rows as well.

Figure 5:
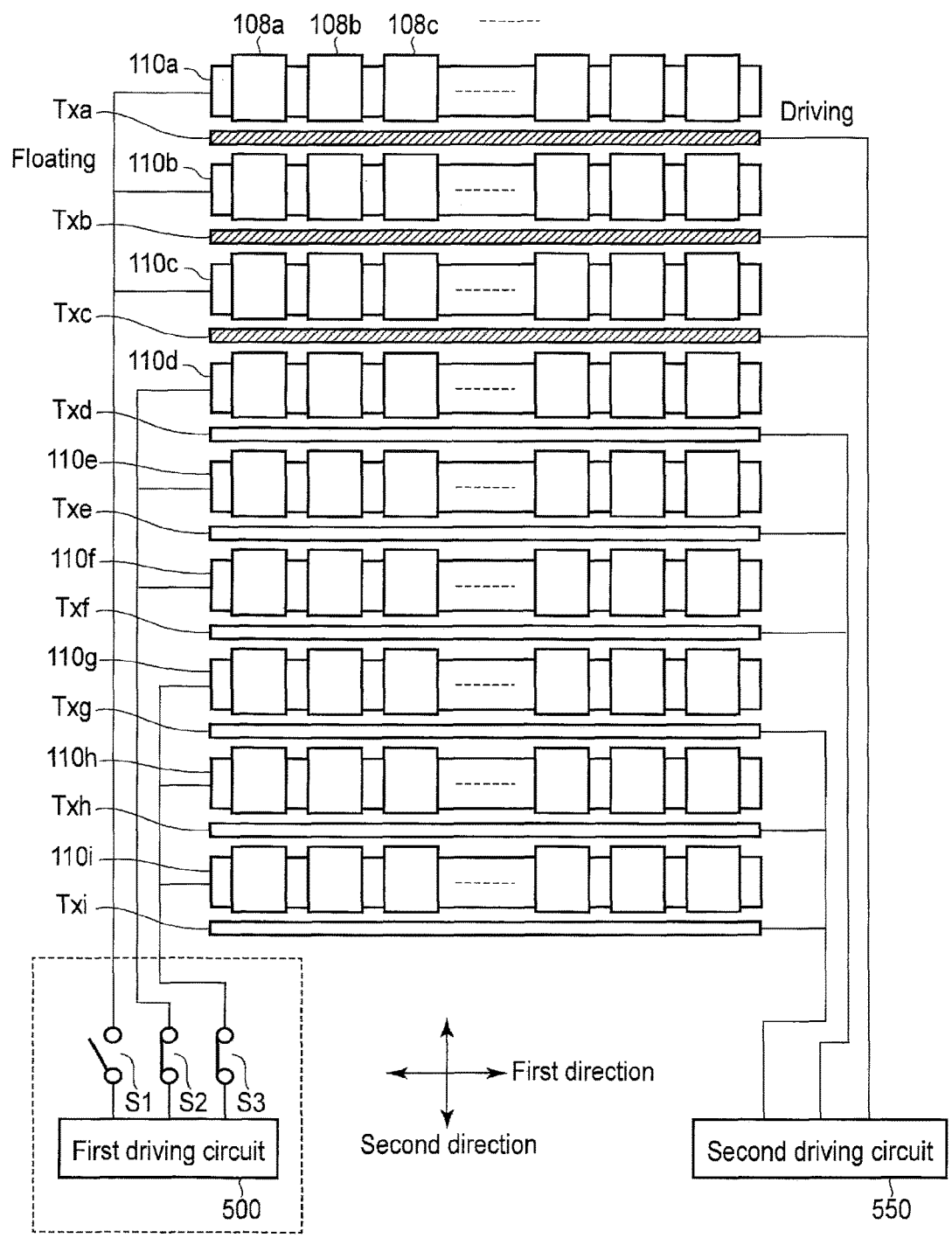
FIG. 5 is an illustration for describing an example of driving the common electrode and the first detection electrode elements Tx(a-i).

FIG. 5 is an illustration for describing the state of an operation period for acquiring an operation input by driving the first detection electrode elements. The first detection electrode elements Txa, Txb, and Txc are driven by applying a drive pulse (a driving signal) of a predetermined frequency for a certain period. At this time, switch S1 is opened (i.e., to establish an off state) to allow the common electrodes 110a, 110b, and 110c corresponding to the first detection electrode elements Txa, Txb, and Txc to be in the floating state, and the remaining common electrodes 110d to 110i are made to have a fixed potential as a result of being applied a direct-current voltage. Consequently, by the effect of the first detection electrode elements Txa, Txb, and Txc which are being driven, it is possible to prevent the potential of the other common electrodes 110d to 110i from being varied, and an image display state (which may also be referred to as a retention state) from being adversely affected.

As described above, the first detection electrode elements in units of three rows, for example, are sequentially driven by the drive pulse, whereby the corresponding common electrodes in units of three rows are sequentially controlled to be in the floating state in synchronization with this driving, and the remaining common electrodes are controlled to have a fixed potential by a direct-current voltage. Note that the driving in units of three rows is only an example, and the number of rows is not limited.

As described above, in a period of driving the first detection electrode elements Tx which constitute the input sensor, a group of common electrodes which are in the floating state and a group of common electrodes whose potential is fixed by a direct-current voltage exist.

With the above structure, by forming the first detection electrode elements Tx as an interconnect made of a metallic material such as aluminum, low-resistance can be realized. Accordingly, it is possible to prevent the drive frequency of the input sensor from being lowered. Also, it is possible to reduce the width of the interconnect working as the first detection electrode elements Tx, and a parasitic capacitance can also be reduced. As a result, overall power consumption reduction can also be achieved.

It should be noted that various embodiments can be adopted for driving the common electrodes and driving the first detection electrode elements by the first driving circuit 500 and the second driving circuit 550.

At the time of display driving for displaying an image by using the pixel electrodes (i.e., in a display period), the first driving circuit 500 supplies common driving signals to the common electrodes. Also, at the time of sensing driving in which a sensor performs the sensing, the second driving circuit 550 can supply sensor driving signals to the detection electrode elements, receive sensor detection signals from the detection electrode elements, or receive sensor detection signals from the detection electrode elements after supplying sensor driving signals to the detection electrode elements.

The operation of receiving the sensor detection signals from the detection electrode elements after the sensor driving signals have been supplied to the detection electrode elements by the second driving circuit 550 may be performed at the time of self-sensing to be described later.

Further, the first driving circuit 500 may keep the common electrodes at a fixed potential at the time of sensing driving. Furthermore, the first driving circuit 500 can switch the state of the common electrodes to an electrically floating state at the time of sensing driving. Alternatively, if a structure in which all of the common electrodes can be switched between the fixed potential state and the floating state, a circuit size of the first driving circuit can be reduced.

Figure 6:
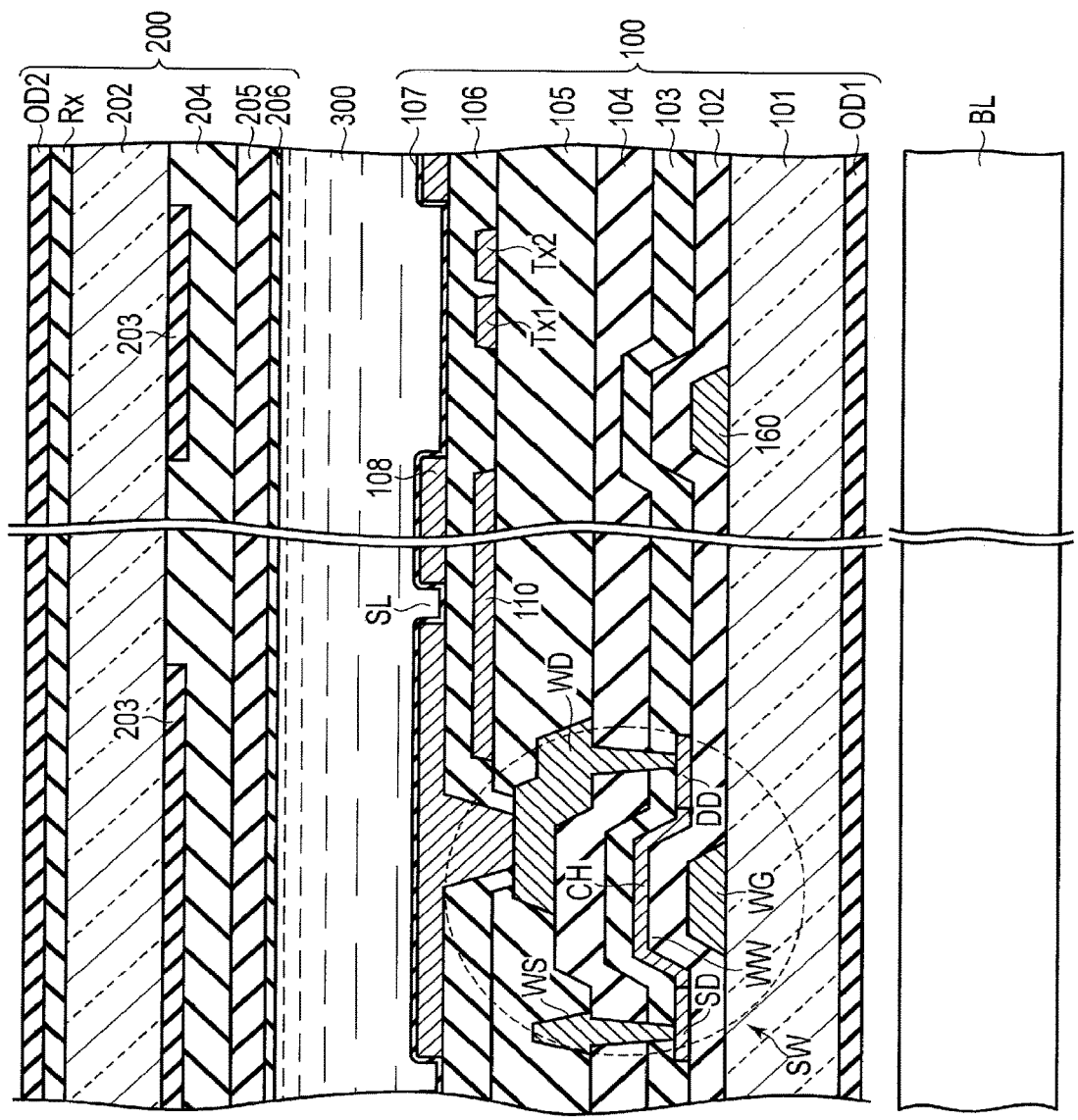
FIG. 6 is a cross-sectional view of a part of a pixel region according to another embodiment.

FIG. 6 shows another embodiment in which two detection electrode elements Tx1 and Tx2 are arranged for one common electrode. That is, the arrangement of first detection electrode elements Tx is not limited in such a way that one electrode is provided for one common electrode. Since the other constituent features are the same as those described in the part referring to FIG. 3, explanations of them will be omitted.

When the two first detection electrode elements Tx1 and Tx2 are arranged for one common electrode as described above, a capacitance for detecting the operation input can be increased.

Figure 7:
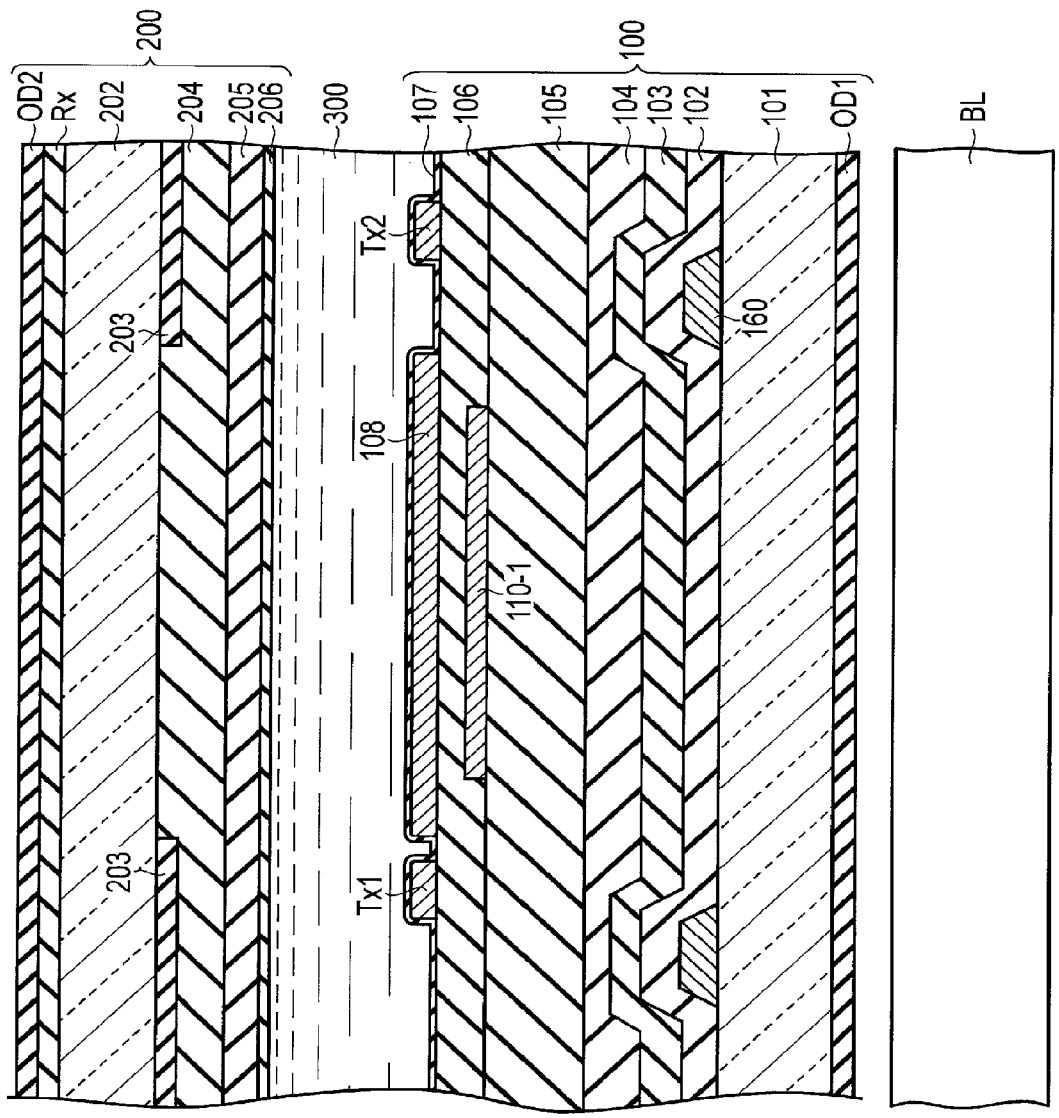
FIG. 7 is a cross-sectional view taken along line X-X of FIG. 8, for describing the positional relationship between a common electrode and first detection electrode elements Tx1 and Tx2, of the embodiment shown in FIG. 8.

FIG. 7 shows yet another embodiment in which first detection electrode element Tx is arranged in the same layer as the layer where pixel electrode 108 is disposed. The layer in which the first detection electrode element Tx is disposed is not limited to the same layer as the layer in which the common electrode 110 is disposed. Even in the case where the first detection electrode element Tx is arranged in the same layer as the layer in which the pixel electrode 108 is disposed, the first detection electrode element Tx is arranged such that it forms a pair with the common electrode in order to enable the control described with reference to FIG. 5.

FIG. 8 shows the positional relationship between the first detection electrode element Tx and the common electrode 110 when the first detection electrode element Tx is arranged in the same layer as the layer in which the pixel electrode 108 is disposed. When the first detection electrode element Tx is arranged in the same layer as the layer in which the pixel electrode 108 is disposed, the first detection electrode element Tx is arranged between the switching element SW and the adjacent pixel electrode, as seen in a planar view. That is, as shown in FIG. 8, first detection electrode element Tx-1 is paired with common electrode 110-1, and first detection electrode element Tx-2 is paired with common electrode 110-2.

FIG. 9A is an illustration for describing an example of a period in which the detection electrode elements are driven in the above embodiment. FIG. 9B is an illustration for describing another example of a period in which the detection electrode elements are driven in the above embodiment.

In a timing chart of FIG. 9A, in one frame period T1F, image signal write period TM is set for a period from start time t1 to time t2. For a period from time t2 to time t3, period TD for reading a sensor detection signal from the sensor is set. In a pixel circuit, the row in which signal writing is not performed and from which the sensor detection signal is not read is in a retention state in which a written image signal is retained. In the retention state (which may also be referred to as a display state of the pixel circuit), the common electrodes are kept at a constant direct-current voltage.

In the example of a timing chart of FIG. 9B, in one frame period, image signal write periods TM1, TM2, . . . , TMn, and periods TD1, TD2, . . . , TDn for reading sensor detection signals are set in a time-sharing manner. Also in this case, in the pixel circuit, the row in which writing of an image signal is not performed and from which a sensor detection signal is not read is in the retention state (the display state) of the image signal.

FIG. 10 shows the state of the common electrodes in the image signal write periods (or the display periods) and the sensor driving periods (i.e., sensor detection signal read periods) in the timing chart shown in FIG. 9B. Also, this figure is an explanatory diagram illustrating the state in which driving signals are given to the detection electrode elements.

That is, in this device, common electrodes 110FL, 110FL, . . . corresponding to the first detection electrode elements Tx being driven are controlled to be in the floating state. Common electrodes 110DC, 110DC, . . . corresponding to the first detection electrode elements Tx not being driven are fixed at a constant direct-current (DC) voltage. Also, when the first detection electrode elements Tx are driven, they are given a drive pulse (Tx driving signal) of a predetermined frequency, and at times other than that, they are given a constant direct-current (DC) voltage.

The driving as described above is carried out by the first driving circuit 500 and the second driving circuits 550 shown in FIGS. 3 and 4.

Figure 11:
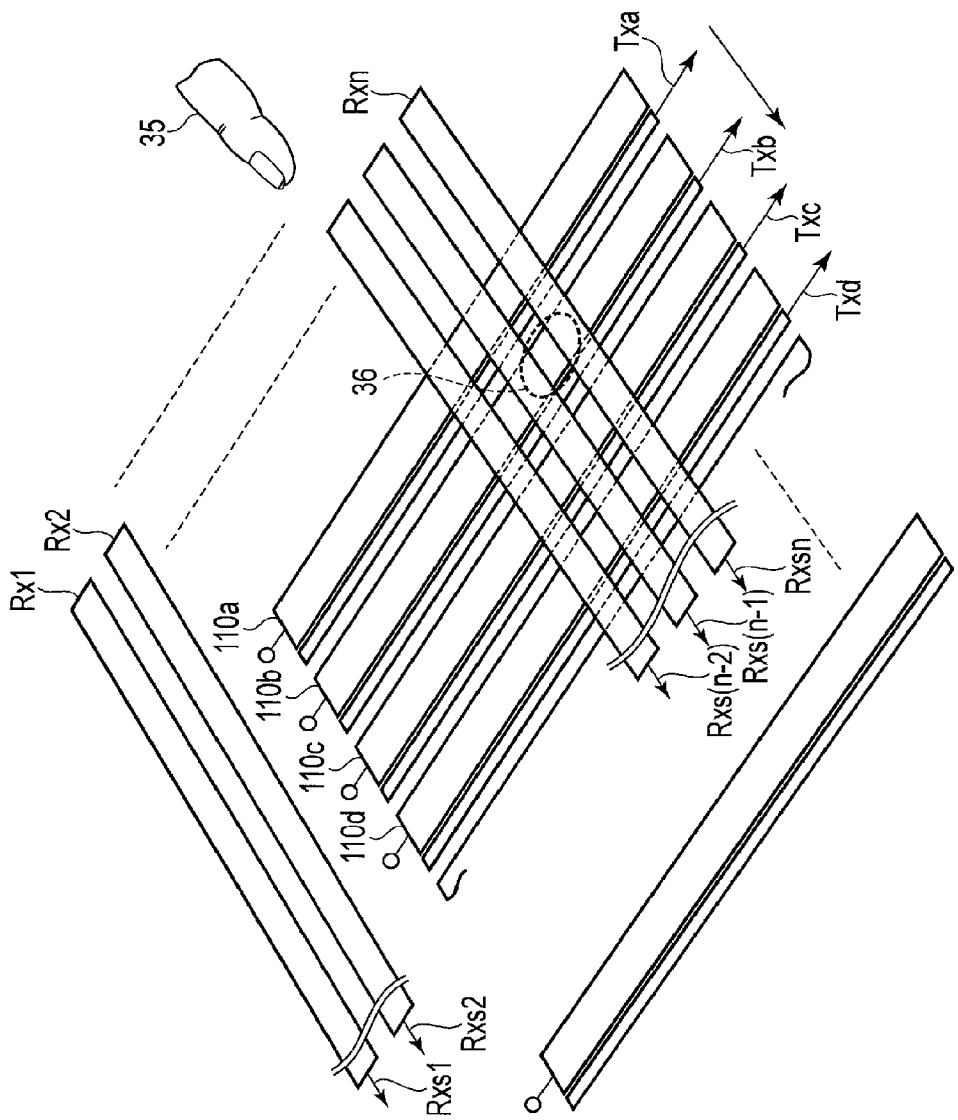
FIG. 11 is an illustration for describing an example of arrangement of first detection electrode elements Tx and second detection electrode elements Rx of an input sensor according to a mutual method, and an operation thereof.

FIG. 11 is an illustration for further describing a basic structure and the operation of the sensor. As described above, in the first substrate 100, the common electrodes 110a, 110b, . . . , and the first detection electrode elements Txa, Txb, . . . are disposed. Also in the second substrate 200, second detection electrode elements Rx1, Rx2, . . . , Rxn are provided. The second detection electrode elements Rx1, Rx2, . . . , Rxn are made of a transparent material, such as ITO, and can form a capacitance with the counterpart first detection electrode elements Txa, Txb, . . . , etc. Rxs1, Rxs2, . . . , Rxs(n−2), Rxs(n−1), Rxsn are detection signals which are output from the second detection electrode elements Rx1, Rx2, . . . , Rxn.

Here, when an external conductor such as a finger 35 is brought close, the capacitance between the opposed detection electrode elements is changed. A coordinate position of the changed capacitance is specified as the change in the sensor detection signals Rxs1 Rxs2, . . . , etc., which are output from the second detection electrode elements Rx1, Rx2, . . . , Rxn is determined by the touch IC chip IC2 (FIG. 1).

For example, it is assumed that the finger 35 is brought close to a position indicated by a circle 36 in FIG. 11. In this case, when the detection electrode elements Txa and Txb are driven, for example, an amplitude of the sensor detection signals Rxs(n−1) and Rxsn from the detection electrode elements Rx(n−1) and Rxn is decreased as compared to the case where the finger is not brought close.

The touch IC chip IC2 (FIG. 1) which controls (includes) the first driving circuit (the detection electrode control circuit) 550 shown in FIGS. 4 and 5 can receive the sensor detection signals Rxs1 to Rxsn as well as driving the first detection electrode elements Tx. Accordingly, the coordinate position of the changed capacitance can be determined by the touch IC chip IC2 on the basis of the driving timing of the first detection electrode elements Txa, Txb, . . . , and the change in the sensor detection signals Rxs1 Rxs2, . . . , etc., which are output from the second detection electrode elements Rx1, Rx2, . . . , Rxn.

Further, in FIGS. 3, 6, 7, etc., while the second detection electrode element Rx is disposed between the polarization film OD2 and the glass substrate 202 in the second substrate (the counter-substrate), the position is not limited to this and the second detection electrode element Rx can be disposed as appropriate in the other layers as long as it is closer to the side of the user's view than the first detection electrode elements Tx are.

FIGS. 12A to 16 are illustrations for describing an example of the other basic structures and operations of the sensor. The detection electrode elements Txa, Txb, Txc . . . , described above can also be used as self-detection electrodes.

A principle of a self-detection method will be described. The self-detection method uses, for example, capacitance Cx1 that the detection electrode element Tx has. Also, the self-detection method uses Cx2 which is produced by the user's finger, etc., that is close to the detection electrode element Tx.

FIGS. 12A and 12B represent the state in which the user's finger is neither brought into contact with nor brought close to an upper surface of the display panel. Accordingly, capacitance Cx2 is not produced between the detection electrode element Tx and the finger. FIG. 12A shows the state in which a power source Vdd and the detection electrode element Tx is connected by a control switch SWc. FIG. 12B shows the state in which the power source Vdd and the detection electrode element Tx are disconnected by the control switch SWc, and the detection electrode element Tx is connected to a capacitor Cpp.

In the state of FIG. 12A, capacitance Cx1 is charged, and in the state of FIG. 12B, capacitance Cx1 is discharged. Here, the matter that capacitance Cx1 is charged means that a constant write signal is written in the detection electrode element Tx. Also, the matter that capacitance Cx1 is discharged means that a signal which indicates a change in the capacitance produced in the detection electrode element Tx is read. The write and read signals described above are output and read from the second driving circuit 550 shown in FIGS. 4 and 5.

Meanwhile, FIGS. 12C and 12D represent the state in which the user's finger is brought into contact with or brought close to the upper surface of the display panel PNL. Accordingly, capacitance Cx2 is produced between the detection electrode element Tx and the finger. FIG. 12C shows the state in which the power source Vdd and the detection electrode element Tx is connected by the control switch SWc. FIG. 12D shows the state in which the power source Vdd and the detection electrode element Tx are disconnected by the control switch SWc, and the detection electrode element Tx is connected to a capacitor Ccp.

In the state of FIG. 12C, capacitance Cx1 is charged, and in the state of FIG. 12D, capacitance Cx1 is discharged.

Here, voltage change characteristics of capacitor Ccp at the time of discharging shown in FIG. 12D are apparently different from those at the time of discharging shown in FIG. 12B because of the presence of capacitance Cx2. Accordingly, in the self-detection method, input position information (for example, whether an operation input has been made) is determined by utilizing the feature that the voltage change characteristics of capacitor Cpp differ depending on the presence or absence of capacitance Cx2.

FIG. 13A shows an example of a basic circuit which realizes the self-detection method. This circuit is provided in the touch IC chip IC2 shown in FIG. 1, for example.

As shown in FIG. 13A, the detection electrode element Tx is connected to one of terminals of capacitor Cp for dividing a voltage, and also to one of input terminals of comparator COMP. The detection electrode element Tx has capacitance Cx of its own. The other one of the input terminals of comparator COMP is connected to a terminal which supplies comparison voltage Vref.

The other one of the terminals of capacitor Cp is connected to a power source line for voltage Vcc via switch SW1. Further, the other one of the terminals of capacitor Cp is connected to one of terminals of capacitor Cc via resistor Rc. The other one of the terminals of capacitor Cc is connected to a reference potential (for example, a ground potential).

Switch SW2 is connected between the other one of the terminals of capacitor Cp and the reference potential, and switch SW3 is connected between the one of the terminals of capacitor Cp and the reference potential. Switches SW1, SW2, and SW3, and comparator COMP are provided within a control circuit inside the touch IC chip IC2.

Next, the operation will be described. Switch SW1 is closed (to establish an on state) at a predetermined cycle to allow capacitor Cc to be charged. When capacitor Cc is charged, switches SW2 and SW3 are opened (to establish an off state). When capacitor Cc is completely charged, all of switches SW1, SW2, and SW3 are opened and a charge in capacitor Cc is maintained.

Next, switches SW2 and SW2 are closed (to establish an on state) for a predetermined length of time (and switch SW1 is kept open so that an off state is maintained). When the switches are operated in this way, most of the charges in capacitor Cp and capacitance Cx is released, and a part of the charge in capacitor Cc is released via resistor Rc.

Next, switches SW1, SW2 and SW3 are all opened (to establish an off state). Then, the charge in capacitor Cc is moved to capacitor Cp and capacitance Cx. An equivalent circuit at this time can be represented as illustrated in FIG. 13B. After that, voltage Vx with respect to capacitance Cx is compared with comparison voltage Vref or threshold voltage Vth in comparator COMP.

As shown in the equivalent circuit of FIG. 13B, when all of switches SW1, SW2, and SW3 are opened (to establish an off state), the charge in capacitor Cc is moved to capacitor Cp and capacitance Cx, and then, a change in voltage Vx with respect to capacitance Cx is compared with comparison voltage Vref in comparator COMP. The operation as described above is repeated until the voltage satisfies the relationship Vx<Vref.

That is, after charging in capacitor Cc has been executed, switches SW2 and SW3 are closed (to establish an on state) for a predetermined length of time (and switch SW1 is kept open so that an off state is maintained). Then, most of the charges in capacitor Cp and capacitance Cx are released, and a part of the charge in capacitor Cc is released via resistor Rc. Next, switches SW1, SW2 and SW3 are all opened (to establish an off state). Then, the charge in capacitor Cc is moved to capacitor Cp and capacitance Cx.

The relationship between voltages Vp, Vc, and Vx and capacitors Cp and Cc and capacitor Cx can be represented by equations (1) to (3) given below.

$$Vc = Vp + Vx \quad (1)$$

$$Vp:Vx = (1/Cp):(1/Cx) \quad (2)$$

$$Vx = (Cp/Cp+Cx)) \times Vc \quad (3)$$

As described above, after capacitor Cc has been charged up to voltage Vc via switch SW1, when opening and closing of switches SW2 and SW3 is repeated while switch SW1 is kept open, voltage Vc of capacitor Cc is gradually lowered and voltage Vx with respect to capacitance Cx is also lowered. This operation, that is, the operation of repeating the opening and closing of switches SW2 and SW3 after capacitor Cc is charged to voltage Vc, is continued until voltage Vx becomes less than comparison voltage Vref.

FIG. 14 shows examples of a waveform of change in voltage Vc of capacitor Cc, and an output waveform of comparator COMP. The horizontal axis represents time and the vertical axis represents voltage.

When switch SW1 is closed (to establish an on state), capacitor Cc is charged to voltage Vcc. After that, all of switches SW1, SW2, and SW3 are opened (to establish an off state), and the charge of capacitor Cc is moved to capacitor Cp and capacitance Cx. Next, a change in voltage Vx with respect to capacitance Cx is compared with comparison voltage Vref in comparator COMP.

The characteristics of the change in voltage Vc or the degree of the change is varied according to a total value of capacitor Cp and capacitance Cx. Also, the change in capacitor Cc has an influence over voltage Vx with respect to capacitance Cx. Further, the value of capacitance Cx is varied according to the degree of closeness of the user's finger to the detection electrode element Tx.

Accordingly, as shown in FIG. 14, when the finger is far from the detection electrode element Tx, the characteristics correspond to VCP1 which involves a gradual change, and when the finger is close to the detection electrode element Tx, the characteristics correspond to VCP2 which involves a rapid change. The reason why a decreasing rate of Vc is greater when the finger is close to the detection electrode element Rx than when it is far is because the value of capacitor Cc has been increased by the capacitance of the finger.

Comparator COMP compares voltage Vp with comparison voltage Vref or threshold voltage Vth in synchronization with the opening and closing of switches SW2 and SW3 repetitively. Further, when Vp>Vref, comparator COMP obtains an output pulse. However, comparator COMP stops obtaining the output pulse when Vp<Vref.

The output pulse of comparator COMP is monitored by a measurement circuit, not shown, within the touch IC chip IC2 or a measurement application. That is, after performing the charging in capacitor Cc once, repetitive discharge by switches SW1 and SW2 mentioned above for a short period of time is executed and a value of voltage Vp is repetitively measured.

At this time, a period for obtaining the output pulse of comparator COMP (MP1 or P2) may be measured, or the number of output pulses of comparator COMP (i.e., the number of pulses after capacitor Cc has been charged to the time when Vref becomes greater than Vp (Vp<Vref)) may be measured.

When the finger is far from the detection electrode element Tx, the period is long, and when the finger is close to the detection electrode element Tx, the period is short. Alternatively, when the finger is far from the detection electrode element Tx, the number of output pulses of comparator COMP is large, and when the finger is close to the detection electrode element Tx, the number of output pulses of comparator COMP is small. Accordingly, the degree of closeness to a planar surface of the sensor can be determined by the number of detection pulses.

Next, in order to detect the position of a finger which touches the planar surface of the sensor two-dimensionally, the detection electrode elements Tx are arranged two-dimensionally (in matrix), thereby enabling the position of the finger which touches the planar surface of the sensor to be detected. As described above, although whether the user's finger has an effect on the detection electrode element Tx is detected, the time for that detection is on the order of several tens of μm to several ms.

However, the self-detection method used in the present embodiment is not necessary used for the purpose of detecting the position of a finger which touches the planar surface of the sensor two-dimensionally.

For example, by the second driving circuit 550 (FIG. 4), the detection electrode elements Txa, Txb, Txc, . . . are bundled per several rows (for example, three to five rows), and the detection electrode elements for each bundle is controlled for self-detection operation. When this self-detection operation is performed, the second driving circuit 550 can detect on which group of rows (i.e., the bundle) the touching finger is positioned. Alternatively, the second driving circuit 550 can detect from which group of rows (i.e., the bundle) the touching finger has moved, and to which group of rows (i.e., the bundle) the touching finger has moved.

The self-detection function described above can be utilized when an operation input of simply scrolling an image in the second direction (upward or downward), for example, is required. Alternatively, the self-detection function described above can be utilized in detecting in which way of the second direction (upward or downward) the touching finger has moved, for example.

FIG. 15 shows a configuration example of detection electrode elements that can be adapted in both the self-detection method and a mutual detection method. In the operation of a self-detection method, the detection element electrodes Tx1 to Txn are mainly used. In the first substrate (which may also be referred to as the array substrate), a plurality of detection electrode elements Txa, Txb, Txc, . . . are disposed in the first direction. In the second substrate (which may also be referred to as the counter-substrate), a plurality of detection electrode elements Tx1 to Txn (transparent electrodes) are disposed along the second direction intersecting the first direction. All of the detection electrode elements Txa, Txb, Txc, . . . , and Tx1 to Txn can be driven, and a change in the potential of the detection electrode elements Tx1 to Txn is detected.

Accordingly, the detection electrode element Rx does not need to be provided within the second substrate (the counter-substrate) 200. An amount of the change in the potential when a finger is brought close to a region 37 shown in FIG. 15 at the time of driving the detection electrode elements Txb and Tx (n−2) is different from that when the finger is not close, as indicated in, for example, FIGS. 12A to 12D and FIG. 13A. Note that the detection electrode elements Txa, Txb, Txc, . . . , and Tx1 to Txn may be bundled by an arbitrary number to perform the driving and the detection.

FIG. 16 shows another example of a configuration of the detection electrode elements Tx of the self-detection method. In the first substrate (which may also be referred to as the array substrate), a plurality of detection electrode elements Txa1 to Txan, Txb1 to Txbn, Txc1 to Txcn . . . are disposed along the common electrodes 110a, 110b, 110c, . . . , etc. Driving and detection is separately conducted in each of the detection electrode elements Txa1 to Txan, Txb1 to Txbn, Txc1 to Txcn, . . . , etc. Accordingly, a region near the finger can be detected with high accuracy. Also, the detection electrode element Rx does not need to be provided within the second substrate (the counter-substrate) 200. An amount of the change in the potential when a finger is brought close to a region 38 shown in FIG. 16 at the time of driving the detection electrode element Txb1 is different from that when the finger is not close, as indicated in, for example, FIGS. 12A to 12D and FIG. 13A. Note that the detection electrode elements Txa1 to Txan, Txb1 to Txbn, Txc1 to Txcn, . . . , may be bundled by an arbitrary number to perform the driving and the detection.

In one aspect, the above embodiment can be described as follows:

A first substrate comprises a gate line extending in a first direction, a source line extending in a second direction intersecting the first direction, a switching element which is electrically connected to the gate line and the source line, and a pixel electrode which is electrically connected to the switching element. Further, a common electrode is opposed to the pixel electrode, and extends in the first direction. Furthermore, a detection electrode element necessary for sensing the state of closeness of a conductor which brought externally extends parallel to the common electrode, and is formed of a metallic material.

Also, a second substrate is opposed to the first substrate with a liquid crystal layer interposed between the first and second substrates, and comprises a light-shielding layer (which may also be referred to as a light-shielding film) which is opposed to the gate line and the detection electrode element, and extends in the first direction.

In addition, common electrodes, each corresponding to the above-described common electrode, are connected to a first driving circuit for each bundle (or group) of n electrodes (where n is a positive integer), and detection electrode elements, each corresponding to the above-described detection electrode element, are paired with the common electrodes, and connected to a second driving circuit for each bundle (or group) of n elements (where n is a positive integer), in which when one bundle of the detection electrode elements is given a drive pulse from the second driving circuit, the first driving circuit allows a bundle of the common electrodes corresponding to the one bundle of the detection electrode elements being driven to be in a floating state, and fixes the remaining common electrodes at a predetermined direct-current voltage.

Moreover, when a pixel signal is written in a region of the pixel electrode selected by the gate line and the source line, and/or the written pixel signal is retained, the second driving circuit can set the detection electrode elements to be at the same direct-current potential as the common electrodes.

Further, at the time of display driving for displaying an image by using the pixel electrode, the first driving circuit 500 can supply common driving signals to the common electrodes. Furthermore, at the time of sensing driving in which the sensing is performed, the second driving circuit 550 can supply sensor driving signals to the detection electrode elements, receive sensor detection signals from the detection electrode elements, or receive sensor detection signals from the detection electrode elements after supplying sensor driving signals to the detection electrode elements.

In another aspect, the above embodiment can be described as follows:

A first substrate comprises the gate line, the source line, the switching element, the pixel electrode, the common electrodes, and the detection electrode elements. Here, the common electrodes are driven by the first driving circuit for each bundle (or group) of n electrodes (where n is a positive integer), and the detection electrode elements are paired with the common electrodes and are driven by the second driving circuit for each bundle (or group) of n elements (where n is a positive integer). Further, when one bundle of the detection electrode elements is given a drive pulse from the second driving circuit, the first driving circuit allows a bundle of the common electrodes corresponding to the one bundle of the detection electrode elements being driven to be in a floating state, and fixes the remaining common electrodes at a predetermined direct-current voltage.

Here, furthermore, when a pixel signal is written in a region of the pixel electrode selected by the gate line and the source line, and/or the written pixel signal is retained, the second driving circuit may set the detection electrode elements to be at the same direct-current potential as the common electrodes.

In another aspect, the above embodiment can be described as follows:

That is, the above embodiment relates to a display device having the following features:

(a1) The display device comprises: a first substrate comprising a first layer in which a plurality of pixel electrodes to which switching elements are connected, respectively, are arranged two-dimensionally; a second substrate which is opposed to the first substrate with a liquid crystal layer interposed between the first and second substrates, and comprises a plurality of light-shielding films which are opposed to the arrangement of the switching elements in a predetermined direction; and a common electrode which is arranged in either the first substrate or the second substrate in order to form a driving electric field for driving liquid crystals of the liquid crystal layer in cooperation with the plurality of pixel electrodes, and is characterized in that the first substrate is a non-display area, and an electrode of a metallic interconnect which constitutes the input sensor is disposed in the predetermined direction of arrangement of the switching elements in a region opposed to the plurality of light-shielding films.

(a2) Further, the common electrode is disposed relative to the pixel electrode of the first substrate via an insulating layer, and the electrode of the metallic interconnect is formed in the first layer likewise the common electrode.

(a3) Alternatively, the common electrode is disposed relative to the pixel electrode of the first substrate via an insulating layer, and the electrode of the metallic interconnect is formed in the same layer as the layer where the pixel electrode is formed.

(a4) Further, a width of the common electrode having a shape of a band corresponds to a width of one pixel.

(a5) Further, electrodes of metallic interconnects disposed between the band-like common electrodes are separated in groups, and the electrodes of the metallic interconnects of each group establish common connection.

(a6) Further, the non-display area in which the electrodes of the metallic interconnects are disposed is opposed to the positions of electrodes of the switching elements which constitute a pixel circuit.

A display device having a backlight and a liquid crystal layer has been described as the above embodiment. However, needless to say, a concept of this invention is also applicable to a display device comprising a light-emitting element (for example, an organic EL element).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor-equipped display device comprising:
   a first substrate comprising a gate line extending in a first direction, a source line extending in a second direction intersecting the first direction, a switching element which is electrically connected to the gate line and the source line, and a pixel electrode which is electrically connected to the switching element;
   a common electrode which is opposed to the pixel electrode and extending in the first direction; and
   a detection electrode element which extends parallel to the common electrode, is formed of a metallic material, and is driven for sensing a state of closeness of a conductor brought externally,
   wherein:
   common electrodes, each corresponding to the common electrode of the first substrate, are driven by a first driving circuit for each bundle (or group) of n electrodes (where n is a positive integer), and detection electrode elements, each corresponding to the detection electrode element of the first substrate, are paired with the common electrodes and are driven by a second driving circuit for each bundle (or group) of n elements (where n is a positive integer); and
   when one bundle of the detection electrode elements is given a drive pulse from the second driving circuit, the first driving circuit allows a bundle of the common electrodes corresponding to the one bundle of the detection electrode elements being driven to be in a floating state, and fixes the remaining common electrodes at a predetermined direct-current voltage.

2. The sensor-equipped display device of claim 1, wherein a second substrate, which is opposed to the first substrate with a liquid crystal layer interposed between the first and second substrates, is opposed to the gate line and the detection electrode element, and comprises a light-shielding film extending in the first direction.

3. The sensor-equipped display device of claim 2, wherein the second substrate comprises second detection electrode elements which output detection signals when the detection electrode elements provided in the first substrate are driven.

4. The sensor-equipped display device of claim 2, wherein the second substrate comprises second detection electrode elements which are usable for a self-detection method.

5. The sensor-equipped display device of claim 1, wherein the detection electrode element is positioned in a same layer as a layer in which the common electrode is arranged.

6. The sensor-equipped display device of claim 1, wherein the detection electrode element is positioned in a same layer as a layer in which the pixel electrode is arranged.

7. The sensor-equipped display device of claim 1, wherein a plurality of detection electrode elements are provided close to each other and parallel such that they correspond to the common electrode.

8. A method of controlling a display device comprising a first substrate and a second substrate,
   the first substrate comprising:
   a gate line extending in a first direction, and a source line extending in a second direction intersecting the first direction;
   a switching element which is electrically connected to the gate line and the source line, and a pixel electrode which is electrically connected to the switching element;
   a common electrode which is opposed to the pixel electrode and extending in the first direction; and
   a detection electrode element which extends parallel to the common electrode, is formed of a metallic material, and is necessary for sensing a state of closeness of a conductor brought externally,
   the second substrate being opposed to the first substrate with a liquid crystal layer interposed between the first and second substrates, opposed to the gate line and the detection electrode element, and comprising a light-shielding film extending in the first direction, wherein:
   common electrodes, each corresponding to the common electrode of the first substrate, are driven by a first driving circuit for each bundle (or group) of n electrodes (where n is a positive integer), and detection electrode elements, each corresponding to the detection electrode element of the first substrate, are paired with the common electrodes and are driven by a second driving circuit for each bundle (or group) of n elements (where n is a positive integer); and
   when one bundle of the detection electrode elements is given a drive pulse from the second driving circuit, the first driving circuit allows a bundle of the common electrodes corresponding to the one bundle of the detection electrode elements being driven to be in a floating state, and fixes the remaining common electrodes at a predetermined direct-current voltage.

9. The method of controlling the display device of claim 8, wherein when a pixel signal is written in a region of the pixel electrode selected by the gate line and the source line, and/or the written pixel signal is retained, the second driving circuit sets the detection electrode elements to be at a same direct-current potential as the common electrode.

* * * * *